(12) United States Patent
Jenestreet

(10) Patent No.: US 8,191,840 B2
(45) Date of Patent: Jun. 5, 2012

(54) T-CHANNEL FIXTURE-MOUNTING POLE CLAMP

(76) Inventor: Francis Clifton Jenestreet, Charlestown, RI (US)

( * ) Notice: Subject to any disclaimer, the term of this patent is extended or adjusted under 35 U.S.C. 154(b) by 173 days.

(21) Appl. No.: 12/581,323

(22) Filed: Oct. 19, 2009

(65) Prior Publication Data

US 2010/0102185 A1    Apr. 29, 2010

Related U.S. Application Data

(60) Provisional application No. 61/108,202, filed on Oct. 24, 2008.

(51) Int. Cl.
  *B65D 63/02*   (2006.01)
  *A47G 29/00*   (2006.01)
(52) U.S. Cl. ................. 248/218.4; 24/20 R
(58) Field of Classification Search ........... 248/219.1, 248/219.3, 219.4, 227.3, 230.1, 230.6, 231.71; 24/20 R, 279, 284, 285
See application file for complete search history.

(56) References Cited

U.S. PATENT DOCUMENTS

| | | | |
|---|---|---|---|
| 1,024,002 A | 4/1912 | Fournier | |
| 2,714,653 A * | 8/1955 | Lemmers | 362/221 |
| 3,200,731 A | 8/1965 | Hart, Jr. | |
| 3,462,110 A * | 8/1969 | Cheslock | 248/219.4 |
| 4,175,305 A | 11/1979 | Gillis | |
| 4,386,767 A | 6/1983 | Dyckes et al. | |
| 4,471,979 A * | 9/1984 | Gibb et al. | 285/373 |
| 4,535,962 A | 8/1985 | Chan et al. | |
| 4,561,617 A | 12/1985 | Hafner | |
| 4,767,131 A | 8/1988 | Springer et al. | |
| 4,903,929 A | 2/1990 | Hoffman | |
| 5,114,113 A | 5/1992 | Krinner | |
| 5,332,184 A | 7/1994 | Davis | |
| 5,384,936 A * | 1/1995 | Van Walraven | 24/279 |
| 6,279,208 B1 | 8/2001 | Gillis | |
| 6,581,896 B1 | 6/2003 | Olexovitch | |
| 6,827,379 B2 | 12/2004 | Hill et al. | |
| 8,083,192 B2 * | 12/2011 | Wells et al. | 248/218.4 |
| 2006/0197000 A1 * | 9/2006 | Meltzer | 248/219.4 |
| 2007/0114337 A1 | 5/2007 | Rommelmann, Jr. | |

OTHER PUBLICATIONS http://store.eurekapartytents.com/products/151318.
http://store.eurekapartytents.com/category/151307/Cables_%26amp%3B_Brackets.

* cited by examiner

*Primary Examiner* — Amy Sterling
*Assistant Examiner* — Erin W Smith
(74) *Attorney, Agent, or Firm* — Maine Cernota & Rardin

(57) ABSTRACT

A pole clamp is disclosed that can firmly attach heavy fixtures to a pole, such as a center or side pole of a special-events tent, with quick and easy fixture mounting and dismounting. The head of a fixture-mounting bolt is downwardly slidable into a T-channel of the clamp, where it rests against a stop pin and rigidly supports the fixture until it is lifted out of the T-channel. A plurality of T-channels can provide for a plurality of fixture attachments at a plurality of orientations. In some embodiments, the clamp includes a pair of identical, hingedly joined, rigid aluminum segments that can be placed on opposite sides of the pole and compressed against the pole by pressing of the unhinged, flanged ends toward each other using a bolt, cam lever, or similar means. The rigid segments can be shaped to accommodate a pole of any cross-sectional size and shape.

18 Claims, 5 Drawing Sheets

T-CHANNEL FIXTURE-MOUNTING POLE CLAMP

RELATED APPLICATIONS

This application claims the benefit of U.S. Provisional Application No. 61/108,202, filed Oct. 24, 2008, incorporated herein by reference in its entirety for all purposes.

FIELD OF THE INVENTION

The invention relates to mounting brackets, and more particularly to brackets for attaching fixtures to a pole.

BACKGROUND OF THE INVENTION

Tents are frequently employed as temporary, low cost structures for a wide variety of activities, including camping trips, dining events, wedding receptions, concerts, expositions, and even circuses. A tent generally costs much less than a permanent structure, and is relatively quick to erect and to dismantle, easy to move, and has a minimal impact on the site where it is erected. A tent can also provide a feeling of being "outdoors," while at the same time providing excellent shelter from the elements.

One difficulty with using a tent to house an activity or event, especially when the activity is a party, celebration, concert, circus, or other special event, is that a tent does not provide a convenient means for mounting lighting, decorations, audio speakers, video monitors, and other such fixtures. Of course, such fixtures can be supported by stands that are independent of the tent, but fixture stands can be expensive, bulky to transport, easy to knock over, and can take up valuable space within a tent.

Another approach is to use clamps to attach fixtures to the poles that support a tent. Typically, the clamps include either a flexible strap or band, or a pair of hinged halves that can extend around a pole and be tightened so as to firmly grip the pole. Some of these clamps attach to fixtures using a clip or similar structure that grips the fixture due to flexing of a flexible clip member and/or due to compressing of a spring. While such clips can be easy to use, they are not suitable for holding fixtures that are heavy and/or must be rigidly held in place. Other clamps attach to a fixture by bolting of the fixture to a suitable bracket fixed to the clamp, or by tightening of a gripping mechanism onto the fixture and/or onto the clamp. These types of clamp can rigidly support heavy fixtures, but typically require considerable time and effort so as to mount and dismount a fixture. In some cases, tools are required for mounting and/or dismounting fixtures from the clamps.

What is needed, therefore, is a tent pole clamp that can rigidly support heavy fixtures, while providing for quick and easy fixture mounting and dismounting.

SUMMARY OF THE INVENTION

The present invention is a tent pole clamp that can be firmly attached to a center or side pole of a tent and can rigidly support a heavy fixture, while providing for quick and easy fixture mounting and dismounting. The invention is applicable in particular to tents that use rigid, load-bearing poles, such as tents that are commonly used in the special events industry. In various embodiments, the holding capacity of the clamp is up to 250 pounds.

The clamp includes at least one rigid segment having an outward-facing surface and at least one side surface adjoining a boundary of the outward-facing surface. A T-channel is formed within the rigid segment and runs parallel to the outward-facing surface. The T-channel extends to and penetrates the outward-facing surface and the side surface, so that a portion of a compatible mounting structure can be inserted into the T-channel through the side surface, with the remainder of the mounting structure extending out through the outward-facing surface. For simplicity of expression, the mounting structure is referred to generically herein as a mounting "bolt" with a "head" and a "shaft," the head being the portion that is insertable into the T-channel and the shaft being the portion that can extend through the outward-facing surface. However, it will be understood that the mounting structure is not limited to a literal bolt, but can have any shape wherein, the "head" portion is compatible with insertion into the T-channel and the "shaft" is compatible with extension from the T-channel and out of the outward-facing surface.

The T-channel can have any cross-sectional shape that prevents the head of a mounting bolt from being pulled out of the T-channel through the outward-facing surface. One example is a "T" shape, where the cross portion of the T lies within the rigid segment and the central stem of the "T" extends through the outward-facing surface. However, it is to be understood that the term "T-channel" does not limit the cross sectional shape of the T-channel to a literal T shape. For example, the T-channel can have a triangular cross section, where one vertex of the triangle extends through the outward-facing surface, creating an opening that is narrower than the remainder of the triangle. It will be understood by one of average skill in the art that many other cross-sectional shapes are possible which will allow a mounting bolt to extend beyond the T-channel, but will not allow the head of the mounting bolt to be pulled out of the T-channel through the outward-facing surface.

Once inserted into the T-channel, the mounting bolt is maintained therein and supported thereby, until it is removed by sliding the mounting bolt along the T-channel and out through an edge of the rigid segment. If the T-channel is oriented horizontally, there will be no gravitational tendency for the mounting bolt to slide out of the T-channel. If the T-channel terminates within the rigid segment, it can typically be oriented in such a way that the mounting bolt head will rest gravitationally against the terminating boundary of the T-channel. In some embodiments, both ends of the T-channel penetrate sides of the rigid segment. In certain of these embodiments, at least one stop pin is included in the T-channel so as to prevent the mounting bolt head from gravitationally sliding through the T-channel and falling out of the rigid segment. In other embodiments, a set screw included in the mounting bolt head is tightened within the T-channel so as to fix the mounting bolt head within the T-channel. It will be clear to one of average skill that many other mechanisms known in the art can be used to prevent the mounting bolt head from undesired sliding out of the T-channel due to gravity, or due to any other applied force.

In some embodiments, so as to avoid twisting of the mounting bolt within the T-channel, the head of the mounting bolt includes a pair of flat, opposing, parallel sides that rest against side walls of the T-channel when the mounting bolt head is inserted therein. In various of these embodiments, the head of the mounting bolt is square, rectangular, hexagonal, or round with a pair of opposing flat sides. It will be clear to one of average skill that many other shapes are possible which will resist twisting when inserted into the T-channel.

A fixture can be prepared for mounting to the clamp of the present invention by attaching a compatible mounting bolt to the fixture, such that the mounting bolt head and a portion of the mounting bolt shaft protrude beyond the fixture. The fixture can then be mounted to the clamp simply by sliding the protruding head of the mounting bolt into the T-channel.

Various embodiments include a plurality of T-channels formed in one or more rigid rigid segments. Providing a plurality of T-channels enables attachment of a plurality of fixtures to the same clamp, and in some of these embodiments, the plurality of T-channels provides a plurality of mounting orientations, thereby providing options as to the direction in which an attached mounting bolt will be oriented.

In certain embodiments the rigid portions are made of metal, such as aluminum, and some of these embodiments include portions that are formed by extrusion, milling, drilling, and/or tapping. Some embodiments include a closure cam lever and/or a safety strap. It should be understood that, while the term "rigid" segment is used herein to describe the component of the present invention that contains the T-channel, the rigid segment can in fact include some flexibility, for example in embodiments wherein the rigid segment is pressed against a pole as part of the clamping attachment to the pole.

In various embodiments, the clamp of the present invention is formed by a pair of shaped rigid segments that are hinged to each other at hinged ends, the clamp being extendable around a pole and attachable thereto by pressing the unhinged ends of the rigid segments toward each other and trapping the pole therebetween. The unhinged ends can include flanges, and can be pressed together using a bolt, a cam lever, or any suitable means known in the art. The shaped rigid segments can be formed to accommodate a pole of any cross sectional size and shape, such as round, square, rectangular, or any arbitrary shape. In some of these embodiments, the rigid segments are substantially or completely identical in shape, thereby reducing manufacturing costs. Some of these embodiments include flexing T-channels running parallel to an inward-facing surface of each of the rigid segments. The flexing T-channels provide increased flexibility of the rigid segments in a direction that allows them to better conform to the shape of a pole as they are pressed against the pole. In some embodiments, the flexing T-channels are alternated in location with the T-channels along the rigid segment.

While the present invention is mainly described herein as being applicable to the mounting of fixtures to tent poles, the invention is not limited thereto. Other examples to which the present invention is applicable include mounting lights or fire extinguishers to a roll bar or to a roll cage of an off-road vehicle, or to a pipe scaffold used on a construction site.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
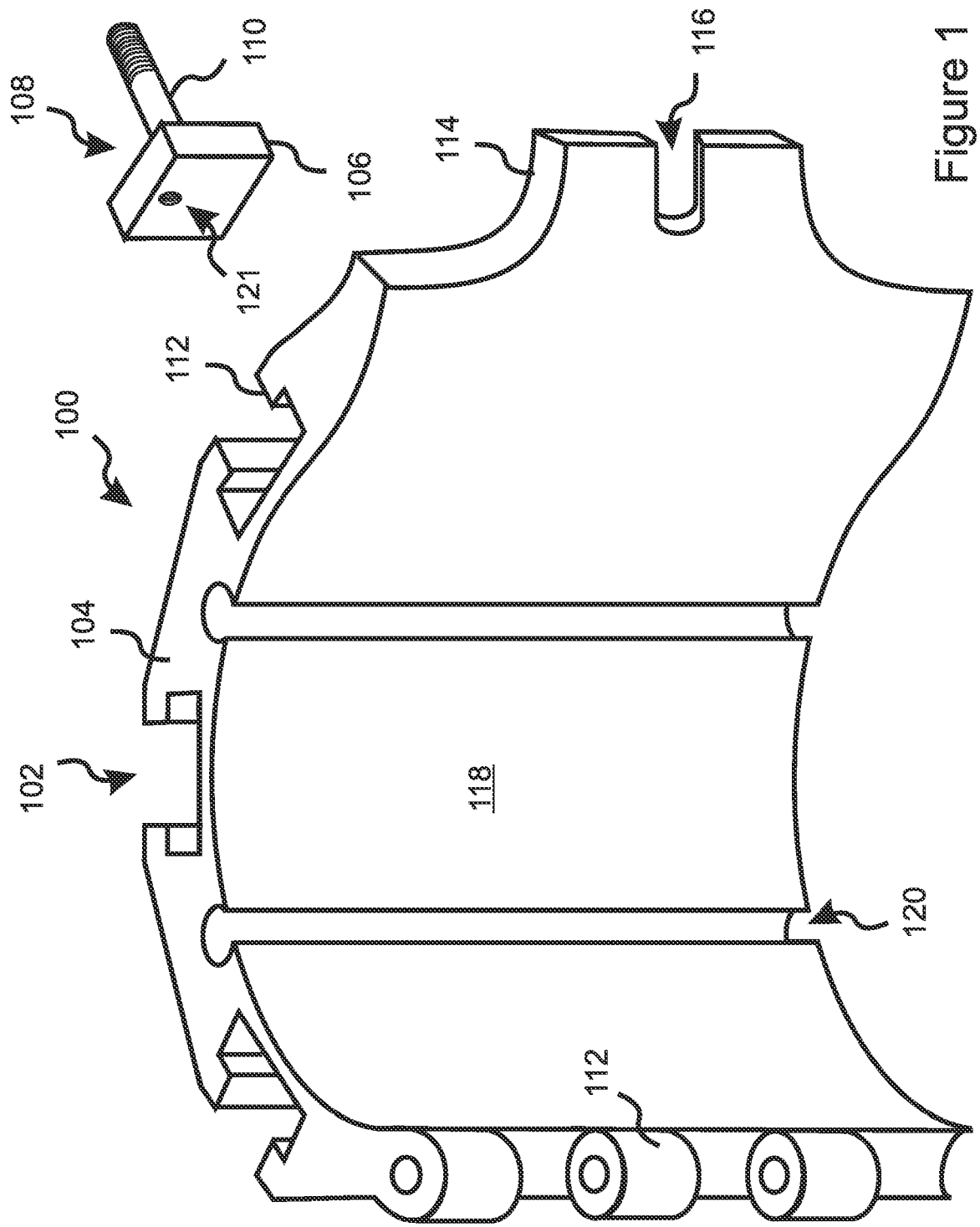
FIG. 1 is a perspective view of the top and inner surface of a rigid segment of a preferred embodiment of the present invention.

With reference to FIG. 1, the present invention is a clamp that can be firmly attached to a center or side pole of a tent and can rigidly support heavy fixtures, while providing for quick and easy fixture mounting and dismounting. The invention is applicable in particular to tents that use rigid, load-bearing poles, such as tents that are commonly used in the special events industry. In various embodiments the holding capacity of the clamp can be as high as 250 pounds.

The clamp of the present invention includes at least one rigid segment 100 having an outward-facing surface and at least one side surface 114 adjoining a boundary of the outward-facing surface (202 in FIG. 2, discussed in more detail below). A T-channel 102 is formed within the rigid segment 100 and runs parallel to the outward-facing surface 202. The T-channel 102 extends to and penetrates the outward-facing surface 202 and the side surface 114, so that a portion 106 of a compatible mounting structure 108 can be inserted into the T-channel 102 through the side surface 114, with the remainder of the mounting structure 110 extending out through the outward-facing surface 202. For simplicity of expression, the mounting structure 108 is referred to generically herein as a mounting "bolt" with a "head" 106 and a "shaft" 110, the head 106 being the portion of the mounting bolt 108 that is insertable into the T-channel 102 and the shaft 110 being the portion of the mounting bolt 108 that can extend through a narrow portion of the T-channel 112 and out through the outward-facing surface 202. However, it will be understood that the mounting structure 108 is not limited to a literal bolt, but can have any shape wherein, the "head" portion 106 is compatible with insertion into the T-channel 102 and the "shaft" 110 portion is compatible with extension through the narrow portion 112 of the T-channel 102 and out of the outward-facing surface 202.

The T-channel 102 can have any cross-sectional shape that prevents the head 106 of a mounting bolt 108 from being pulled out of the T-channel 102 through the outward-facing surface 202. In FIG. 1, the cross section of the T-channel 102 is a "T" shape, where the cross portion of the T lies within the rigid segment and the central stem of the "T" extends through the outward-facing surface. However, it is to be understood that the term "T-channel" does not limit the cross sectional shape of the T-channel to a literal T shape. For example, the T-channel 102 can have a triangular cross section, where one vertex of the triangle extends through the outward-facing surface 202, creating an opening that is narrower than the remainder of the triangle. It will be understood by one of average skill in the art that many other cross-sectional shapes can be implemented which will allow a mounting bolt 108 to extend beyond the T-channel 102, but will not allow the head 106 of the mounting bolt 108 to be pulled out of the T-channel 102 through the outward-facing surface 202.

In the embodiment of FIG. 1, the head 106 of the mounting bolt 110 is rectangular in shape. It will be understood by one of average skill that the head 106 of the mounting bolt 110 can be square, hexagonal, round with flattened sides, or any other shape that includes two flat, parallel, opposing sides that can rest against the inner sides of the T-channel 102 and prevent the mounting bolt 108 from twisting within the T-channel 102.

Once inserted into the T-channel 102, the mounting bolt 108 is maintained therein and supported thereby, until it is removed by sliding the mounting bolt 108 along the T-channel 102 and out through the side surface 104 of the rigid segment 102. If the T-channel 102 is oriented horizontally, there will be no gravitational tendency for the mounting bolt 108 to slide out of the T-channel 102. If the T-channel 102 terminates within the rigid segment 100, the T-channel can typically be oriented in such a way that the mounting bolt head 106 will rest gravitationally against the terminating boundary of the T-channel 102. In some embodiments, both ends of the T-channel 102 penetrate sides of the rigid segment 100. In certain of these embodiments, at least one stop pin 206 is included in the T-channel 102 so as to prevent the mounting bolt head 106 from gravitationally sliding through the T-channel 102 and falling out of the rigid segment 100. In the embodiment of FIG. 1, a set screw is included in the mounting bolt head 106 and can be tightened within the T-channel 102 so as to fix the mounting bolt head 106 within the T-channel 102. FIG. 1 illustrates the set screw hole 121 without the set screw inserted. It will be clear to one of average skill that many other mechanisms known in the art can be used to prevent the mounting bolt head 106 from undesired sliding out of the T-channel 102 due to gravity, or due to any other applied force.

FIG. 1 illustrates one half of an embodiment of the invention that includes two curved, rigid segments 100 that are substantially identical in shape. The two rigid segments 100 are connected at one end by a hinge 112 and are connectable at the other end by a bolt or similar fastening device that passes through slots 116 and/or holes in flanges 114 extending from the unhinged ends of the rigid segments 100. FIG. 1 illustrates an embodiment wherein the inner surfaces 118 of the rigid segments 100 are curved so as to conform to a round pole, and include interior channels 120 into which elastomeric inserts can be placed. In some embodiments, the elastomeric inserts are rubber cords with a durometer rating of 70 to 90. The elastomeric inserts protrude slightly into the interior space of the clamp, and provide additional gripping strength as the clamp is tightened and the elastomeric inserts are compressed against the pole.

Figure 2:
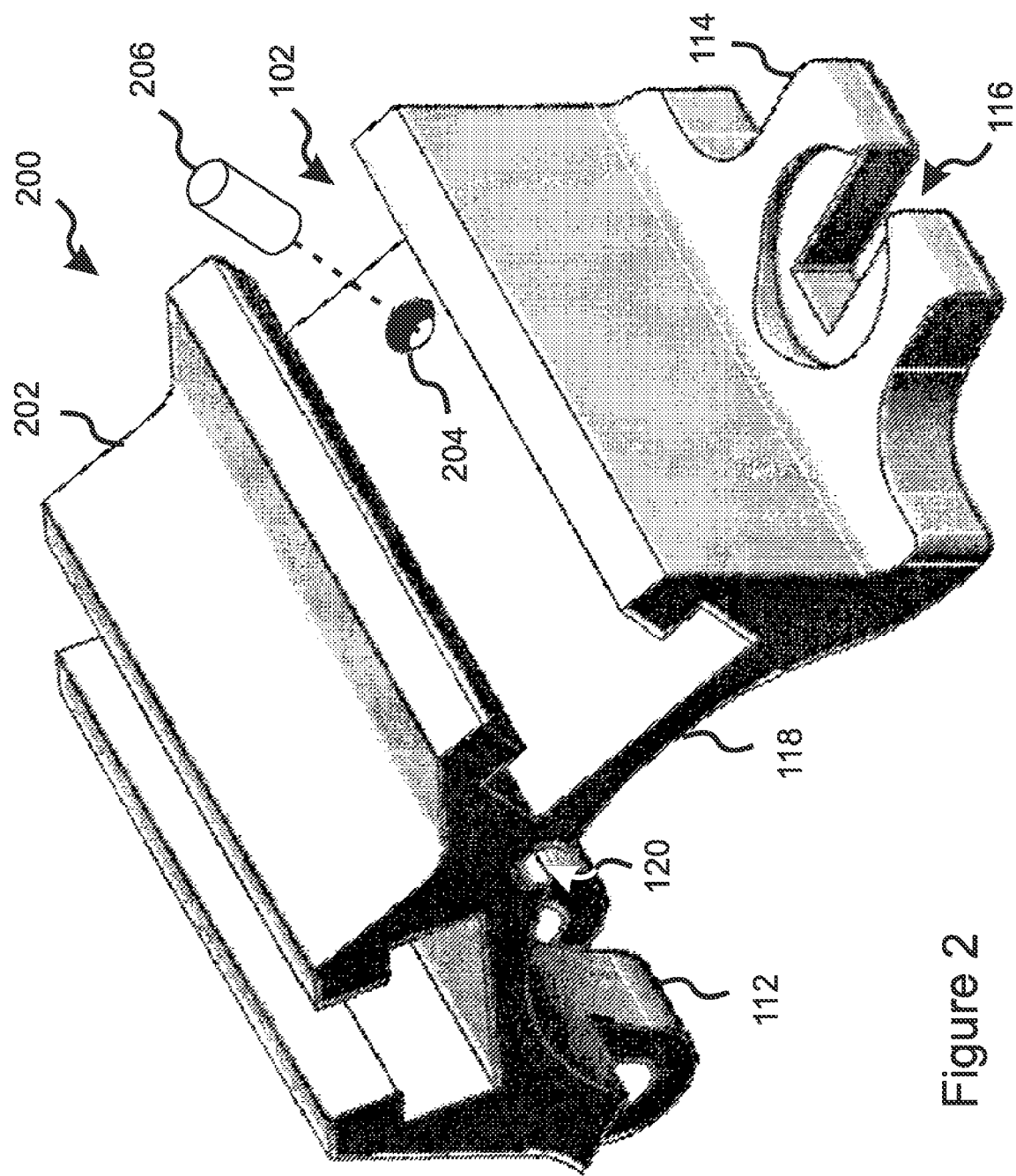
FIG. 2 is a perspective view of the top and outer surface of a rigid segment similar to the rigid segment of FIG. 1.

FIG. 2 illustrates the outward-facing surface 202 of a rigid segment 200 of an embodiment similar to the embodiment of FIG. 1. This embodiment includes holes 204 in the T-channels 102 through which stop pins 206 can be inserted, so as to prevent the head 106 of a mounting bolt 108 from sliding completely through the T-channel 102 and out the other side. Some embodiments include a plurality of stop pin holes 204 in each T-channel 102. Other embodiments include indentations into which set screws included in set-screw holes 121 in the mounting bolt heads 106 can be tightened.

Figure 3:
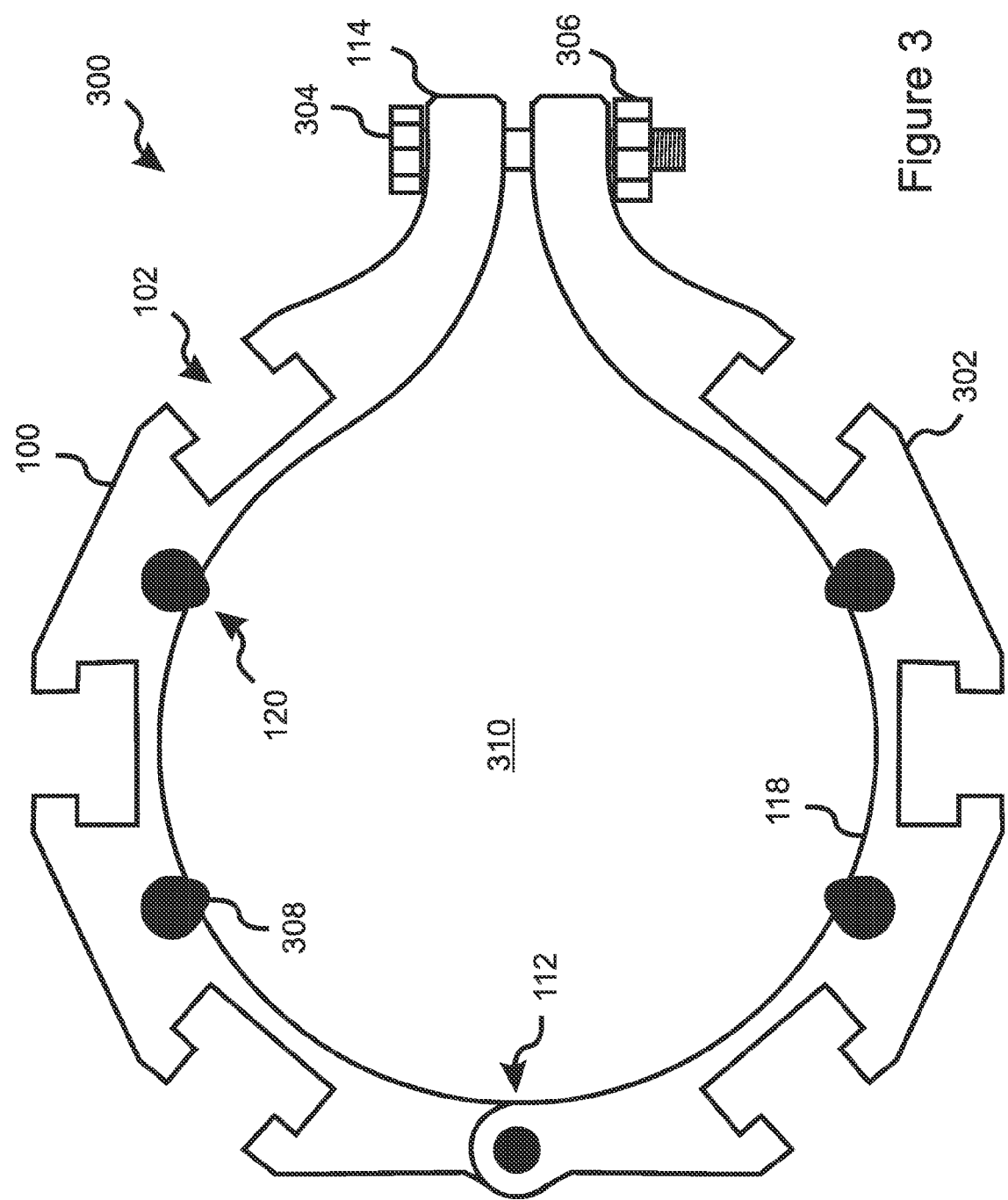
FIG. 3 is a top view of both rigid segments of the embodiment of FIG. 1, joined so as to form a clamp.

FIG. 3 is a top view of the embodiment 300 illustrated partially by FIG. 1, showing both rigid segments 100, 302 attached by the hinge 112, with their flanges 114 pressed toward each other by a bolt 304 and nut 306. In similar embodiments, other means known in the art can be used to press the flanges 114 toward each other, such as a bolt with a wing nut and a washer, or a cam lever. In some embodiments the bolt, cam lever, or other fastening means is/are hingedly attached to one of the flanges 114 so as to avoid the fastening means becoming lost or separated from the clamp 300. Elastomeric inserts 308 have been placed within the interior channels 120. The elastomeric inserts 308 protrude slightly into the interior space 310 of the clamp 300, and provide additional gripping strength as the clamp 300 is tightened and the elastomeric inserts 308 are compressed against a pole.

Figure 4:
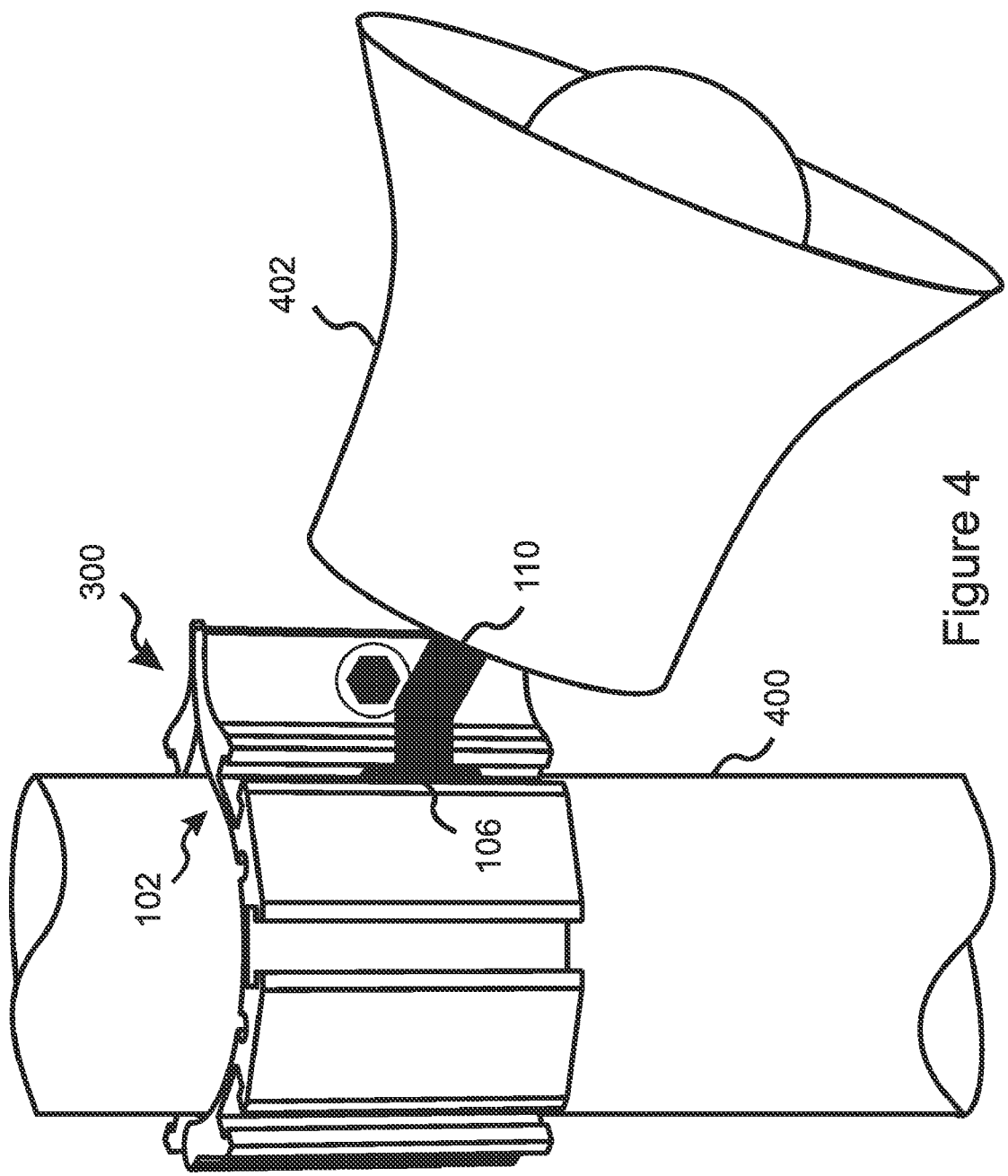
FIG. 4 is a perspective view of the embodiment of FIG. 3 attached to a round pole and supporting a lamp and FIG. 5 is a perspective view of an embodiment similar to FIG. 4, but including a safety strap.

FIG. 4 illustrates attachment of the embodiment of FIG. 3 to a pole 400, and suspension of a light fixture 402 therefrom. The shaft 110 of a mounting bolt 108 has been attached to the light fixture, and then the head 106 of the bolt 108 has been slid into one of the T-channels 102 until it rests gravitationally on a stop pin that blocks the T-channel 102.

Figure 5:
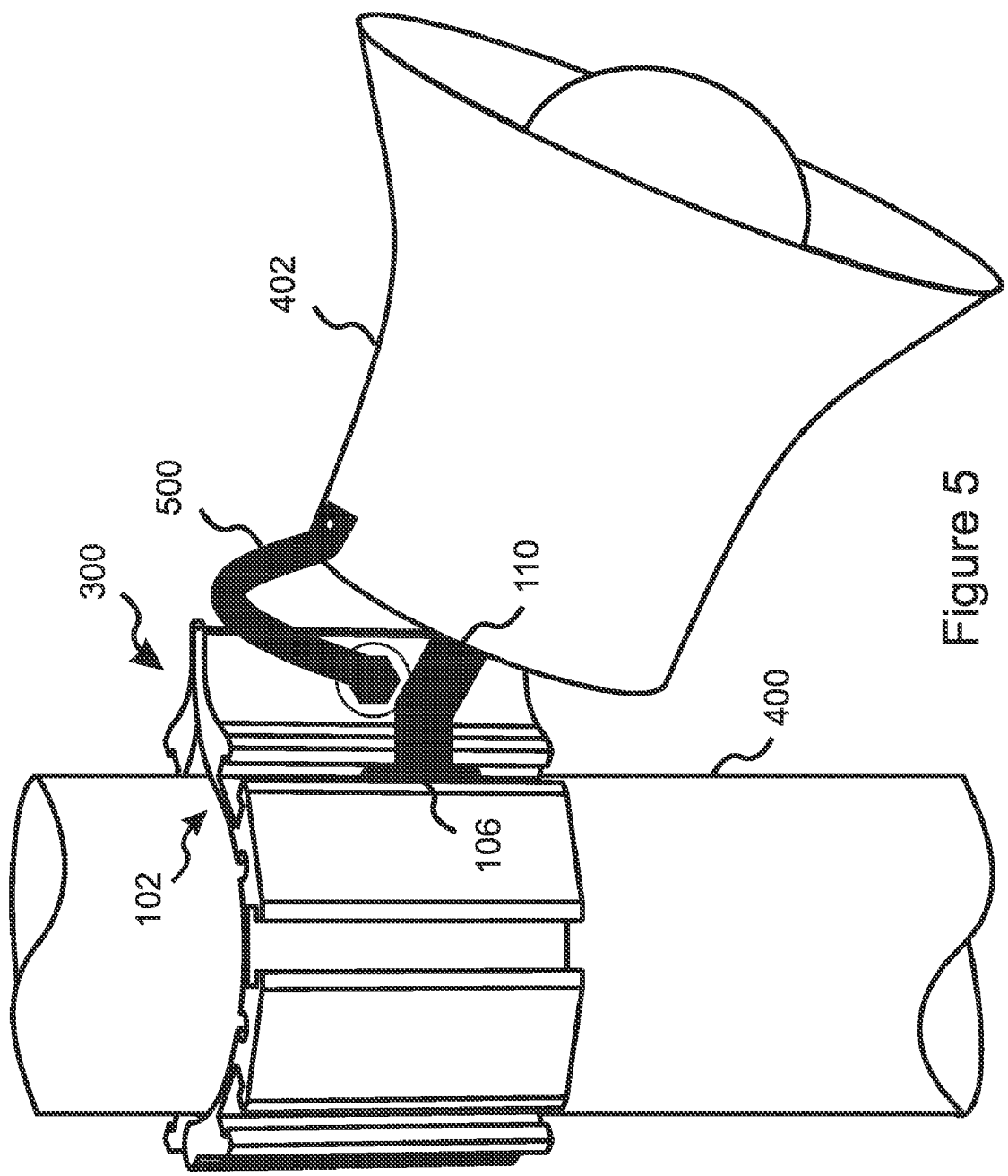

FIG. 5 illustrates an embodiment similar to FIG. 4, except that the head 106 of the mounting bolt 108 is held in place within the T-channel 102 by a set screw 120. A safety strap 500 is included in this embodiment so as to keep the light fixture 402 from falling if the set screw becomes loose and the mounting bolt head 106 slides unexpectedly out through the bottom of the T-channel.

While FIGS. 1-5 illustrate clamps that are formed by two hinged rigid segments 100, 302 with inner surfaces 118 shaped for attachment to a round pole, it should be understood that embodiments of the present invention can be attachable to a pole or other rigid structure of any shape, and that they can be attachable by any clamping means known in the art, such as by tightening of a flexible strap or band around the pole in a manner similar to a cargo strap or a hose clamp. It is only necessary that the clamp be rigidly attachable to the pole, that it include a rigid segment containing a T-channel 102, and that it be able to firmly support the weight of an attached fixture.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A clamping system for attaching a fixture to a pole, the clamping system comprising:
   a pair of rigid segments that can be placed on opposite sides of the pole, attached to each other, and compressively tightened toward each other so as to compress the pole therebetween with a longitudinal axis of the rigid segments being parallel to a longitudinal axis of the pole, the pair of rigid segments including a first rigid segment and a second rigid segment, the first rigid segment having an outward-facing surface, an inward-facing surface, and a pair of opposing side surfaces extending between boundaries of the outward-facing surface and the inward-facing surface;
   a T-channel formed in the first rigid segment parallel to the outward-facing surface and extending to and penetrating both the outward-facing surface and at least one of the side surfaces, so that a head of a compatible mounting bolt can be inserted into the T-channel through the side surface, with the remainder of the mounting bolt extending through the outward-facing surface, the T-channel having a cross-sectional shape that prevents the head of the compatible mounting bolt from being pulled through the outward-facing surface; and
   a plurality of spaced-apart interior channels formed in the first rigid segment, each of the interior channels being parallel to the inward-facing surface and parallel to the longitudinal axis of the first rigid segment, each of the interior channels extending to and penetrating both the inward-facing surface and at least one of the side surfaces of the first rigid segment, each of the interior channels being able to accept insertion of an elastomeric insert through one of the side surfaces, the interior channels having cross-sectional shapes that prevent the elastomeric inserts from falling through the inward-facing surface, while allowing the elastomeric inserts to protrude through the inward-facing surface and be pressed against the pole when the rigid segments are compressively tightened toward each other.

2. The clamping system of claim 1, wherein the T-channel extends between and penetrates two opposing side surfaces of the rigid segment.

3. The clamping system of claim 2, wherein the T-channel includes a stop-pin configured so as to prevent passage of the head of the mounting bolt past the stop-pin.

4. The clamping system of claim 1, further comprising a mounting bolt, the mounting bolt being configured so as to allow a head of the mounting bolt to enter the T-channel through the side surface while a shaft of the mounting bolt protrudes beyond the outward-facing surface.

5. The clamping system of claim 4, wherein the head of the mounting bolt has a cross-sectional shape that is one of:
   a square;
   a rectangle;
   a polygon having an even number of sides; and
   a circle having a pair of flat, opposing sides.

6. The clamping system of claim 4, wherein the mounting bolt is attachable to a fixture by one of:
   screwing a threaded distal end of the shaft of the mounting bolt into a threaded hole of the fixture;
   passing a threaded distal end of the shaft of the mounting bolt through a hole in a portion of the fixture, and screwing a compatible nut onto the distal end so as to clamp the portion of the fixture between the nut and a segment of the shaft that cannot pass through the hole;
   welding the shaft of the mounting bolt to the fixture; and
   clamping the shaft of the mounting bolt to the fixture.

7. The clamping system of claim 4, wherein the head of the mounting bolt includes a set screw that can be tightened within the T-channel so as to fix the mounting bolt in location within the T-channel.

8. The clamping system of claim 1, wherein the first rigid segment includes a plurality of T-channels.

9. The clamping system of claim 8, wherein the plurality of T-channels provides a plurality of mounting directions for mounting bolts attached thereto.

10. The clamping system of claim 1, wherein at least one of the rigid segments is made of metal.

11. The clamping system of claim 10, wherein the metal is aluminum.

12. The clamping system of claim 10, wherein forming of the first rigid segment includes at least one of:
   extrusion:
   milling;
   drilling; and
   tapping.

13. The clamping system of claim 1, further comprising a safety strap.

14. The clamping system of claim 1, wherein each of the rigid segments has a hinged end and a flanged end, the hinged ends being hingedly attached to each other, and the flanged ends being compressible toward each other by a pressing mechanism.

15. The clamping system of claim 14, wherein the pressing mechanism includes at least one of:
   a bolt;
   a nut;
   a washer;
   a wing-nut; and
   a cam lever.

16. The clamping system of claim 1, wherein the clamping system is able to support a fixture weighing more than 200 pounds.

17. A method for attaching a fixture to a pole, the method comprising:
   providing a clamping system including a pair of rigid segments that can be placed on opposite sides of the pole, attached to each other, and compressively tightened toward each other so as to compress the pole therebetween, with a longitudinal axis of the pole being parallel to longitudinal axes of the rigid segments, the pair of rigid segments including a first rigid segment and a second rigid segment, the first rigid segment having an outward-facing surface, an inward-facing surface, and a pair of opposing side surfaces extending between boundaries of the outward-facing surface and the inward-facing surface, a T-channel being formed in the first rigid segment parallel to its outward-facing surface and extending to and penetrating both the outward-facing surface and the side surface, so that a head of a compatible mounting bolt can be inserted into the T-channel through the side surface, with the remainder of the mounting bolt extending through the outward-facing surface, the T-channel having a cross-sectional shape that prevents the head of the compatible mounting bolt from being pulled through the outward-facing surface, the clamping system further including a plurality of interior channels formed in the first rigid segment parallel to the inward-facing surface and parallel to the longitudinal axis, each of the interior channels extending to and penetrating both the inward-facing surface and at least one of the side surfaces, each of the interior channels being able to accept insertion of an elastomeric insert through one of the side surfaces, the interior channels having cross-sectional shapes that prevent the elastomeric inserts from falling through the inward-facing surface, while allowing the elastomeric inserts to protrude through the inward-facing surface and be pressed against the pole when the rigid segments are compressively tightened toward each other;
   attaching a shaft of a mounting bolt to the fixture if the shaft is not already attached thereto, the mounting bolt having a head that is able to enter the T-channel while the shaft of the mounting bolt protrudes beyond the outward-facing surface of the first rigid segment through the central portion of the T-channel;
   inserting the elastomeric inserts into the interior channels through the side surfaces;
   clamping the clamping system to the pole by compressively tightening the rigid segments toward each other, thereby attaching the rigid segments to the pole and pressing protruding portions of the elastomeric inserts against the pole;
   locating the head of the mounting bolt adjacent to the T-channel penetrating the side surface of the first rigid segment; and
   sliding the head of the mounting bolt through the side surface of the first rigid segment and into the T-channel.

18. The method of claim 17, wherein the T-channel includes a stop pin, and sliding the head of the mounting bolt through the side surface of the rigid segment and into the T-channel includes sliding the head of the mounting bolt until it is adjacent to the stop pin.

* * * * *